3,314,800
PROCESS FOR COATING HOT DRY ROASTED NUTS AND THE RESULTING PRODUCT

Peter P. Noznick, Evanston, and Robert H. Bundus, Riverside, Ill., assignors to Beatrice Foods Co., Chicago, Ill., a corporation of Delaware
No Drawing. Filed Aug. 24, 1966, Ser. No. 574,556
17 Claims. (Cl. 99—127)

This invention relates to dry roasted peanuts.

This application is a continuation-in-part of our applications, Ser. No. 437,554, filed Mar. 5, 1965, and Ser. No. 478,479, filed Aug. 9, 1965.

There is a problem in preparing salted dry roasted peanuts because the salt which is applied is granular and has no bonding properties.

In the past there have been proposed carbohydrates, gums, and fats as adhesive agents. However, such materials are relatively high in caloric content.

It is an object of the present invention to prepare salted dry roasted peanuts in which the salt adheres satisfactorily.

Another object is to prepare salted dry roasted peanuts in which the salt does not break from the surface in normal usage.

An additional object is to bond salt to dry roasted nuts using a minimum of starch, gums and fats as adhesive agents.

A further object is to improve the process of preparing dry roasted peanuts including a redrying step.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the above objects can be accomplished by employing vital wheat gluten as a binder for coating salt onto dry roasted peanuts. The salt may be admixed with the vital wheat gluten in the coating mixture prior to its application onto the peanuts, or, the salt may be applied onto the peanuts after the binder coating of vital wheat gluten has been coated on the peanuts. If the salt is to be applied to the peanuts separately from the gluten binder coating, it is preferred that the salt be applied to the coated peanuts before the gluten coating is completely dry.

The gluten is normally peptized in acetic acid although other acids such as lactic acid and adipic acid can also be used. Acetic acid is volatile, imparts flavor and is preferred. The particular acid is somewhat critical since acids such as citric acid and malic acid are unsatisfactory because they give a flaky product. Other gluten-peptizing agents, such as ammonia, may be used in place of acetic acid. If ammonia is used, however, care must be taken to insure that substantially all of the ammonia is volatilized or the final product may contain objectionable odor.

The use of *vital* wheat gluten is critical.

The acetic acid hydrates the vital wheat gluten to get the desired adhesive properties and insures that the adhesive will not break from the surface in normal handling. The gluten is soluble in acetic acid but is not soluble in water alone. The gluten is partially hydrated, e.g., by making a solution of water and acetic acid and adding 2–15% of gluten (based on the total weight of the solution) to hydrate the same. In addition to the vital wheat gluten and the hydrating agent, the balance of the ingredients in the coating mixture is determined by the flavor effects desired. Normally, in addition to the gluten and the hydrating agent, there are added diluents and flavor-enhancing agents. When salt is added directly in the coating mixture, there is frequently employed ground peanuts with the gluten to help prevent salting out. As the diluent, and for additional adhesion, there is usually employed dextrin. The dextrin serves as an additional binder and its relationship with gluten is symbiotic. Canary dextrin is best for this purpose since it is an acid dextrin and has the desired color. Mono-sodium glutamate is frequently employed to enhance the flavor.

The acetic acid can be pure but is normally used in the form of vinegar.

As previously set forth, the use of acetic acid is preferred as the hydrating agent. Acetic acid has a boiling point sufficiently low that in the subsequent drying step the acetic acid is driven off and only the other coating constituents remain.

As pointed out above, the gluten is partially hydrated first. If dextrin is employed, the dextrin is then added, followed by the mono-sodium glutamate. If salt is added to the coating composition, it may be added to the coating mixture at this time. If not all of the gluten is added initially, the balance of the gluten may be mixed into the coating mixture at this point.

The amount of gluten initially hydrated is normally 2–15% by weight of the total solution. When salt is added to the coating mixture prior to coating onto the peanuts, the amount of gluten which may be initially hydrated is limited by the fact that if too much hydrated gluten is present in the mixture, the salt will precipitate the gluten as a gummy mass.

When the salt is added to the coating mixture prior to the coating operation, it is critical that the salyt be finely ground, e.g., of powder size. The salt is in suspension and not in solution. Coarse particles would inhibit atomization by clogging the spray nozzle. The salt is thus normally of 50 mesh size (Tyler sieve series), or less, e.g., 200 mesh.

When the salt is to be coated onto the peanuts separate from and after the coating of vital wheat gluten, it is also desirable that the salt be finely ground, e.g., of powder size. Coarse particles of salt are frequently rubbed off during handling and transporting operations. In addition, large salt particles give an undesirable concentrated bitter salty taste to the product.

Aside from canary dextrin, hydrolized vegetable protein (from hydrolysis of gluten with high temperatures and HCl) can be used as the diluent.

The salt and mono-sodium glutamate levels can be adjusted as is known in the art, to give the desired flavor balance. Dextrin, as stated, is frequently used (1) as a diluent, (2) to take advantage of its adhesive characteristics, and (3) to obtain the desired color. Reaction between the dextrin and the mono-sodium glutamate is the Maillard reaction which imparts a desirable color to the coating when both of these components are used.

Any surplus gluten present is usually non-hydrated and acts as a diluent in the coating mixture.

For best results, the materials are mixed together in the order set forth above. However, all of the gluten can be added after the salt, if the salt is employed in the coating mixture, to slightly solubilize the gluten.

The formulation is sprayed onto the nuts to give a coating residual of about 1-5% on the nuts after drying. The percentages are based on the weight of the nuts.

In place of the canary or acid dextrin there can be used a white dextrin and the desired color obtained by adding a small amount of corn gluten. It should be noted, however, that non-vital corn gluten does not have film-forming properties and cannot be used as a replacement for the *vital* wheat gluten.

The peanuts are dry roasted in conventional fashion. The gluten binder coating mixture is atomized on the hot nuts. The coating is applied intermittently to take advantage of the heat of the nuts to drive off the moisture of the spray solution and thereby build up the thickness by following the procedure of application, drying, further application, further drying. Usually there is applied in all about 10% of the binder mixture (wet basis) on the weight of the nuts. The coating on a dry basis is preferably about 2% of the weight of the nuts although it can be varied within the range of 1 to 5% of the weight of the nuts.

The acetic acid is normally used in the form of vinegar, e.g., 100 to 120 grain vinegar. The water content of the binder mixture is not critical but is dependent upon the viscosity desired in the spray solution. Usually the water content is adjusted to give a maximum viscosity of about 20,000 centipoises at 25° C. The minimum viscosity normally employed is that resulting from a solution containing 65% water by weight. Larger amounts of water could be present but this increases the cost of removal of the water.

When gluten, dextrin and salt are applied to the hot roasted peanuts in a single mixture, it sometimes happens that a puckered or non-uniform surface results because the hot peanuts volatilize the solubilizing agents and the presence of the salt causes syneresis of the gluten, i.e., the gluten comes out of the solution. The non-uniform distribution of the gluten binder on the surface of the peanuts may in turn cause uneven distribution of the salt and other flavoring agents. For these reasons, it is sometimes preferred to apply a gluten-dextrin binder coating onto the peanuts in a first coating and thereafter add salt and other flavoring agents to the tacky surface of the nuts in a dry powdered form. In using this embodiment of the invention, the addition of the salt powder should be at a time when the coating of gluten-dextrin binder is not wet, but not completely dry, i.e., when the coating is tacky and adhesive.

When a wet-surfaced nut is fed onto an oscillating conveyor, the frictional constant of the nut changes in value as the nut is being dried. The change makes the control of redrying extremely difficult because the amount of energy required to move a wet-surfaced nut is much greater than that required to move a dry-surfaced nut at the same speed. Wet-surfaced nuts should, therefore, be redried in a single direction constant feed conveyor.

When the salt is applied to the hot roasted nuts separately from the gluten binder solution, the gluten binder solution is first applied onto the hot dry roasted peanuts, e.g., at 310° F. The water and volatile acetic acid contained in the binder solution are substantially all driven off by the heat of the nuts. The hot nuts should thus be at a temperature which is preferably about 200° F., most preferably above 212° F., and below that at which off-flavors are imparted to the nuts. Before the binder-coated nuts are completely dry, i.e., when the binder is still in the tacky-adhesive condition, the salt and other flavoring agents are applied to the nuts in a powdered form.

Unless otherwise indicated all parts and percentages are by weight.

SALT MIXED WITH THE GLUTEN BINDER SOLUTION PRIOR TO COATING ONTO THE NUTS

The following two examples illustrate the embodiment of the invention where salt is included in the gluten coating mixture:

Example 1

To 39.32 parts of water and 9.8 parts of 120 grain distilled white vinegar at room temperature there was added 2.46 parts of vital wheat gluten. There was then added 14.7 parts of canary dextrin followed by 6.86 parts of mono-sodium glutamate and then 14.7 parts of sodium chloride which passed through a 50 mesh sieve.

To this mixture there was added an additional 12.24 parts of vital wheat gluten. This mixture was then passed through an atomizer and sprayed on hot, dry roasted peanuts immediately after the roasting was completed. The spraying was done intermittently to allow the water and volatile acetic acid to be driven off with the aid of the heat of the nuts. The intermittent spraying was continued until there was a build-up of 4% (on a dry basis) of the coating based on the weight of the nuts.

Example 2

| | Parts |
|---|---|
| Water | 43.67 |
| Vinegar (120 grain) | 11.79 |
| Acid (canary) dextrin | 13.1 |
| Mono-sodium glutamate | 5.24 |
| Flour salt (salt which passes a 50 mesh sieve) | 13.1 |
| Vital wheat gluten | 13.1 |

The procedure was the same as in Example 1. Of the total of 13.1 parts of vital wheat gluten there was added 2.77 parts in the first stage and 10.33 parts in the second stage.

The range of proportions of materials in the coating mixture can be varied as follows:

| | Percent |
|---|---|
| Vital wheat gluten | 5-50 |
| Salt | 10-50 |
| Mono-sodium glutamate | 2-20 |
| Dextrin | 5-50 |
| Acetic acid | 0.5-6 |
| Water | 30-80 |

The preferred composition on a dry basis is:

| | Percent |
|---|---|
| Vital wheat gluten | 28.5 |
| Salt | 28.5 |
| Mono-sodium glutamate | 11.42 |
| Dextrin | 28.5 |
| Acetic acid | 3.08 |

POWDERED SALT ADDED TO NUTS AFTER THE NUTS ARE COATED WITH THE GLUTEN BINDER

The following example and discussion show the embodiment of the invention where powdered salt is applied to the tacky and adhesive nuts after the nuts have been coated with the gluten binder composition:

Example 3

A gluten binder solution of the following composition was prepared:

| | Parts |
|---|---|
| Water | 60.8 |
| Vinegar (100 grain white) | 11.85 |
| Canary dextrin | 22.8 |
| Vital wheat gluten (80% protein) | 4.65 |

The above mixture was passed through an atomizer and sprayed on hot, dry roasted peanuts immediately after the roasting was completed. The spraying was done intermittently to allow the water and volatile acetic acid to be driven off with the aid of the heat of the nuts. The intermittent spraying was continued until there was a build-up of about 1.5 to 2% (on a dry basis) of the binder coating based on the weight of the nuts.

When the binder coating was not yet completely dry but also not wet, i.e., when the coating was tacky and adhesive, a dry powder was applied to the coated nuts. This dry powder has the following composition:

| | Percent |
|---|---|
| Salt (fine flake) | 55 |
| Mono-sodium glutamate | 4 |
| Hydrolyzed vegetable protein | 15 |
| Dry roasted peanut meal | 10 |
| Vital wheat gluten | 6 |
| Canary dextrin | 10 |

The powder is preferably not a fine dusty powder but is a coarse crystalline material. After the dry powder was applied to the coated nuts the nuts were put through a controlled redrying step on an oscillating conveyor. The temperature of the redrier should not be much above 250° F. since too high a temperature would cause the coating on the nuts to lose adhesion. In the specific example the temperature was 225° F. for 4.5 minutes. The loss of adhesion at very high temperatures is believed to be due to the migration of the oil of the nuts to the surface. In addition, there may be a loss of hydroxy bonding at the high temperatures.

The redrying time required is generally related to the temperature. Thus redrying can be carried out at 250° F. for three minutes. When lower temperatures are used, proportionally longer time should be employed, e.g., 200° F. for six minutes.

The range of proportions of materials in the binder-coating mixture can be varied as follows:

| | Percent |
|---|---|
| Water | 35–80 |
| Acetic acid | 2–20 |
| Dextrin | 5–30 |
| Vital wheat gluten | 1–20 |

The preferred composition for the binder mixture is:

| | Percent |
|---|---|
| Water | 60.8 |
| Acetic acid | 11.85 |
| Dextrin | 22.8 |
| Vital wheat gluten | 4.65 |

The amount of binder solution to be applied to the dry roasted peanuts can be varied within the range of 3 to 20% (wet basis) on the weight of the nuts. The binder coating on a dry basis is preferably about 2% of the weight of the nuts although it can be varied within the range of 1 to 5% of the weight of the nuts.

The range of proportions of materials in the dry powder added prior to redrying can be varied as follows:

| | Percent |
|---|---|
| Salt | 20–70 |
| Mono-sodium glutamate | 0.5–15 |
| Hydrolyzed vegetable protein | 2–30 |
| Dextrins | 2–20 |
| Dry roasted peanut meal | 2–20 |
| Vital wheat gluten | 2–20 |

The preferred composition for the dry powder is:

| | Percent |
|---|---|
| Salt | 55 |
| Mono-sodium glutamate | 4 |
| Hydrolyzed vegetable protein | 15 |
| Canary dextrin | 10 |
| Dry roasted peanut meal | 10 |
| Vital wheat gluten | 6 |

The amount of dry powder to be applied to the coated nuts can be varied within the range of 0.5 to 10% based on the weight of the uncoated nuts. Preferably the powder is about 4% of the weight of the uncoated nuts.

What is claimed is:

1. A process comprising coating hot dry roasted peanuts with an aqueous adhesive mixture comprising vital wheat gluten, salt and an acid selected from the group consisting of acetic acid, lactic acid and adipic acid and removing the water to form a dry coating on the peanuts.

2. A process according to claim 1 wherein said acid is acetic acid.

3. A process according to claim 2 wherein the aqueous mixture is applied intermittently to the hot peanuts and the heat of the nuts is allowed to cause evaporation of the water between each application.

4. A process according to claim 3 wherein the aqueous mixture includes a flavoring agent and a diluent.

5. A process according to claim 4 wherein the flavoring agent is mono-sodium glutamate and the diluent is dextrin.

6. A process according to claim 2 wherein said aqueous adhesive mixture is prepared by mixing water, acetic acid and up to 15% of vital wheat gluten based on the total of water and acetic acid, then adding salt, then adding additional vital wheat gluten and said coating step is carried out by spraying the resulting mixture on hot, dry roasted peanuts.

7. A process according to claim 5 wherein said aqueous adhesive mixture is prepared by mixing water, acetic acid and up to 15% of vital wheat gluten, dextrin, mono-sodium glutamate and salt, the salt being added after the gluten, then adding further vital wheat gluten and said coating step is carried out by intermittently spraying the resulting mixture on hot, dry roasted peanuts.

8. Dry roasted peanuts having an adhesive coating comprising vital wheat gluten and salt.

9. Dry roasted peanuts according to claim 8 wherein said adhesive coating further contains mono-sodium glutamate.

10. Dry roasted peanuts according to claim 9 wherein said adhesive coating further contains dextrin.

11. In a process of coating dry roasted peanuts with a flavoring mixture including salt the improvement comprising first coating said dry roasted peanuts while hot with an aqueous adhesive mixture containing vital wheat gluten and dextrin and thereafter applying said flavoring mixture onto the coated peanuts while the gluten mixture is still in a tacky-adhesive condition.

12. A process according to claim 11 wherein said aqueous adhesive mixture further contains an acid selected from the group consisting of acetic acid, lactic acid and adipic acid.

13. A process according to claim 12 wherein said adhesive mixture comprises an aqueous solution of vital wheat gluten, dextrin and acetic acid.

14. A process according to claim 12 wherein said flavoring mixture further comprises mono-sodium glutamate.

15. Dry roasted peanuts having thereon an inner layer of adhesive mixture, said adhesive mixture comprising vital wheat gluten, and dextrin and an outer layer of dry flavoring mixture comprising salt coated on said inner layer.

16. Dry roasted peanuts according to claim 15 wherein said dry flavoring mixture further comprises mono-sodium glutamate.

17. Dry roasted peanuts according to claim 16 wherein said dry flavoring mixture further comprises dextrin and roasted peanut meal.

References Cited by the Examiner

UNITED STATES PATENTS

| | | | |
|---|---|---|---|
| 1,602,826 | 10/1926 | Kuhn | 99—127 |
| 2,026,813 | 1/1936 | Bizzell et al. | 99—11 |
| 2,582,188 | 1/1952 | Zaloom | 99—127 |

OTHER REFERENCES

"Bakers Digest," volume XXXVI, number 2, pp. 69–70, April 1962.

Rose et al.: The Condensed Chemical Dictionary, New York, Reinhold Pub. Corp. 1956, p. 526.

A. LOUIS MONACELL, *Primary Examiner.*

S. E. HEYMAN, *Assistant Examiner.*